(12) United States Patent
Boniface et al.

(10) Patent No.: US 8,719,908 B1
(45) Date of Patent: May 6, 2014

(54) DIGITAL CERTIFICATE MANAGEMENT

(71) Applicant: Disney Enterprises, Inc., Burbank, CA (US)

(72) Inventors: Richard Boniface, Orlando, FL (US); Michael Randall, Clemont, FL (US); Janet Friedman, Longwood, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 13/724,185

(22) Filed: Dec. 21, 2012

(51) Int. Cl.
*G06F 7/04* (2006.01)
*H04L 29/06* (2006.01)
*H04L 9/32* (2006.01)
*G06F 17/30* (2006.01)

(52) U.S. Cl.
CPC ............ *H04L 9/3268* (2013.01); *H04L 9/3263* (2013.01); *H04L 63/0823* (2013.01)
USPC .................. 726/6; 726/10; 713/156

(58) Field of Classification Search
CPC .. H04L 63/0823; H04L 9/3268; H04L 9/3263
USPC ......................... 726/6, 10; 713/156
See application file for complete search history.

(56) References Cited

U.S. PATENT DOCUMENTS

| | | | |
|---|---|---|---|
| 8,473,735 B1 * | 6/2013 | Jarvie et al. .................... | 713/156 |
| 2002/0004773 A1 * | 1/2002 | Xu et al. ......................... | 705/36 |
| 2005/0076200 A1 * | 4/2005 | Thornton et al. .............. | 713/156 |
| 2005/0076202 A1 * | 4/2005 | Thornton et al. .............. | 713/156 |
| 2005/0091484 A1 * | 4/2005 | Thornton et al. .............. | 713/156 |
| 2009/0037728 A1 * | 2/2009 | Kamikura ....................... | 713/156 |
| 2010/0132018 A1 * | 5/2010 | Takala et al. ....................... | 726/5 |
| 2012/0084843 A1 * | 4/2012 | Hernoud et al. ................. | 726/5 |
| 2012/0210124 A1 * | 8/2012 | Lieber ........................... | 713/158 |

\* cited by examiner

*Primary Examiner* — Michael Simitoski
(74) *Attorney, Agent, or Firm* — Pillsbury Winthrop Shaw Pittman LLP

(57) ABSTRACT

This disclosure relates to a digital certificate management system configured to consolidate information related to digital certificates across enterprise systems. In some implementations, the system may be configured to automate recurring harvesting of digital certificate information from current and/or future enterprise systems associated with one or more companies. The system may be configured to standardize the digital certificate information in a centralized database. The system may be configured to identify owners associated with individual digital certificates and pro-actively notify the owners of information associated with digital certificate due dates, for example. In some implementations, the system may be configured to escalate the notifications to the owners and/or other entities as expiration dates approach. In some implementations, the system may comprise an application server, enterprise systems, and/or other components. The application server may comprise a processor, electronic storage, a user interface, and/or other components.

19 Claims, 3 Drawing Sheets

| 200 Digital Certificate Parameter Examples |
|---|
| Algorithm ID |
| Extensions |
| Issuer |
| Issuer Unique Identifier |
| Public Key Algorithm |
| Serial Number |
| Signature |
| Signature Algorithm |
| Subject |
| Subject Public Key |
| Subject Unique Identifier |
| Validity Not After |
| Validity Not Before |
| Version |

| 202 Example Certificate Discovery Tools |
|---|
| 802.11X Authentication Systems |
| Agent-Based Certificate Scanners |
| Certificate Authorities |
| Network Mapping Scanners |
| Network-Based Certificate Scanners |
| Vulnerability Assessment Scanners |
| Wired Network Control Systems |
| Wireless Network Control Systems |

| 204 Device Parameter Examples |
|---|
| Common Name |
| DNS Name |
| IP Address(es) |
| Last Seen |
| Last Used |
| Logical Location |
| MAC Address(es) |
| NetBIOS Name |
| Owning Approval Group |
| Owning Segment or Business Unit |
| Owning Support Group |
| Physical Location |
| Related Application(s) |

| 206 Example Device Discovery Tools |
|---|
| 802.11X Authentication Systems |
| Active Directory |
| Anti-Malware Detection Systems |
| Configuration Management Databases |
| Network Mapping Scanners |
| Network-Based Certificate Scanners |
| Rogue Device Detection Systems |
| Software Distribution Systems |
| Vulnerability Assessment Scanners |
| Wired Network Control Systems |
| Wireless Network Control Systems |

| 208 Contact Parameter Examples |
|---|
| Address(es) |
| Cost Center |
| Department |
| E-Mail Address(es) |
| Employee ID |
| Name(s) |
| Privileges (related to CIPHER) |
| Reporting Hierarchy |
| Status |
| Telephone Number(s) |
| Time Zone |
| User ID(s) |

| 210 Example Contact Discovery Tools |
|---|
| Active Directory |
| Contractor Directories |
| Employee Directories |
| Incident/Call Tracking Systems |
| Organization Charts |
| SAP |
| Telephone Directories |
| Vendor Directories |

FIG. 2

DIGITAL CERTIFICATE MANAGEMENT

FIELD OF THE DISCLOSURE

This disclosure relates to a digital certificate management system configured to consolidate information related to digital certificates across enterprise systems.

BACKGROUND

Digital certificates are known. Expired digital certificates cause information technology (IT) system disruptions. The volume of digital certificates utilized by the IT systems of a given company makes tracking expiration dates and/or other information related to digital certificates difficult. Typically, no single system or small group of systems provides a consolidated view of information related to digital certificates utilized across an entire company. Often, certificate expiration is tracked manually using decentralized and non-standardized methods. Such methods may include individual or shared spreadsheets, or individual or team expiration date calendars, for example. Commercially available tracking software addresses portions of the tracking problem, but only for a subset of certificates, generally the certificates provided by the company that makes the commercially available software.

SUMMARY

This disclosure relates to a digital certificate management system configured to consolidate information related to digital certificates across enterprise systems. In some implementations, the system may be configured to automate recurring harvesting of digital certificate information from current and/or future enterprise systems associated with one or more companies. The system may be configured to standardize the digital certificate information in a centralized database. The system may be configured to identify owners associated with individual digital certificates and pro-actively notify the owners of information associated with digital certificate due dates, for example. In some implementations, the system may be configured to escalate the notifications to the owners and/or other entities as expiration dates approach. In some implementations, the system may comprise an application server, enterprise systems, and/or other components. The enterprise systems may include devices related to operation of the enterprise system and/or other devices. The application server may comprise a processor, electronic storage, a user interface, and/or other components.

The enterprise systems may include one or more software and/or hardware systems configured to support business processes, information flow in a business, business operations, planning systems, customer support systems, and/or other aspects of a business. The devices may include servers, electronic storage, network hardware, communication hardware, and/or other devices related to information technology infrastructure, business operations, and/or other aspects of businesses. For example, enterprise systems for a corporation may include software and/or hardware to support document management systems, physically secure building facilities, provide access to email, and/or perform other business functions. Enterprise systems for a theme park may include the software and/or hardware necessary to run a ride, run a restaurant, support corporate offices, and/or perform other business functions. Enterprise systems for a media network company may include software and/or hardware to support broadcast communication, content generation, and/or other business functions.

The processor may be configured to execute one or more computer program modules. The computer program modules may comprise one or more of a discovery module, a device module, a contacts module, a correlation module, a confidence module, a storage module, a notification module, and/or other modules.

The discovery module may be configured to discover digital certificates used by the enterprise systems. The discovered digital certificates may include digital certificates used to electronically authenticate actions by the devices in the enterprise systems. The discovery module may be configured to obtain sets of certificate parameters corresponding to the discovered digital certificates. The certificate parameters may include expiration dates, and/or other parameters.

The device module may be configured to identify devices in the enterprise systems regardless of whether or not they have used digital certificates. In some implementations, identifying devices that do not use certificates may be as informative as identifying devices that do use certificates. The device module may be configured to obtain sets of device parameters corresponding to the identified devices.

The contacts module may be configured to identify contacts. The contacts module may be configured to obtain sets of contact parameters corresponding to the identified contacts. The contact parameters may include name, status, location, team, department, cost center, telephone, electronic mail, direct reports, peers, bosses, and/or other parameters.

The correlation module may be configured to determine whether individual sets of certificate parameters are related to individual sets of device parameters. The correlation module may be configured to determine whether individual sets of certificate parameters are related to individual sets of device parameters by analyzing the certificate parameters in the set of certificate parameters relative to the device parameters in the set of device parameters, and/or vice versa. Responsive to matches between one or more of the certificate parameters from the set of certificate parameters and one or more device parameters from the set of device parameters, the correlation module may be configured to determine that an individual set of certificate parameters is related to an individual set of device parameters. The correlation module may be configured to automatically correlate individual digital certificates with individual devices responsive to determining that the individual sets of certificate parameters and the individual sets of device parameters are related. Correlating may include associating and/or linking the individual digital certificates with the individual devices.

The correlation module may be configured to determine whether individual sets of certificate parameters are related to individual sets of contact parameters. The correlation module may be configured to determine whether individual sets of certificate parameters are related to individual sets of contact parameters by analyzing the certificate parameters in the set of certificate parameters relative to the contact parameters in the set of contact parameters, and/or vice versa. Responsive to matches between one or more of the certificate parameters from the set of certificate parameters and one or more contact parameters from the set of contact parameters, the correlation module may be configured to determine that an individual set of certificate parameters is related to an individual set of contact parameters. The correlation module may be configured to automatically correlate individual digital certificates with individual contacts responsive to determining that the individual sets of certificate parameters and the individual sets of contact parameters are related. Correlating may include associating and/or linking the individual digital certificates with the individual contacts.

The confidence module may be configured to determine confidence levels that quantify probabilities that the individual sets of certificate parameters of the individual certificates are related to the individual sets of device parameters of the individual devices and/or are related to the individual sets of contact parameters of the individual contacts. The confidence module may be configured to determine the confidence levels based on the analysis performed by the correlation module, and/or other information. In some implementations, the confidence module may be configured such that the overall confidence levels comprise weighted confidence scores.

The storage module may be configured to store information related to one or more of the discovered digital certificates, the certificate parameters, the identified devices, the device parameters, the identified contacts, the contact parameters, the correlation of the discovered digital certificates with the identified devices, the correlation of the discovered digital certificates with the identified contacts, the confidence levels, the weighted confidence scores, and/or other information electronically. The storage module may be configured to store the information in electronic storage, in a database of a database server, and/or in other locations. The storage module may be configured to store the information in a standardized format that incorporates all of the relevant information, independent of the individual characteristics of the digital certificates, the enterprise systems, the devices, the contacts, and/or other factors. The storage module may be configured to store the information such that it can be retrieved at a later time responsive to a user request via a user interface.

The notification module may be configured to generate expiration date notifications before the expiration dates. The notification module may be configured to obtain expiration dates from the certificate parameters determined by the discovery module. The notification module may be configured such that the notifications are directed to a designated owner of a digital certificate and/or or device. In some implementations, the notification module may be configured such that the expiration date notifications include urgency levels. The notification module may be configured such that the urgency levels escalate as the expiration dates approach.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2 shows example lists of possible digital certificate parameters, certificate discovery tools, device parameters, device discovery tools, contact parameters, and possible contact discovery tools.

DETAILED DESCRIPTION

Figure 1:
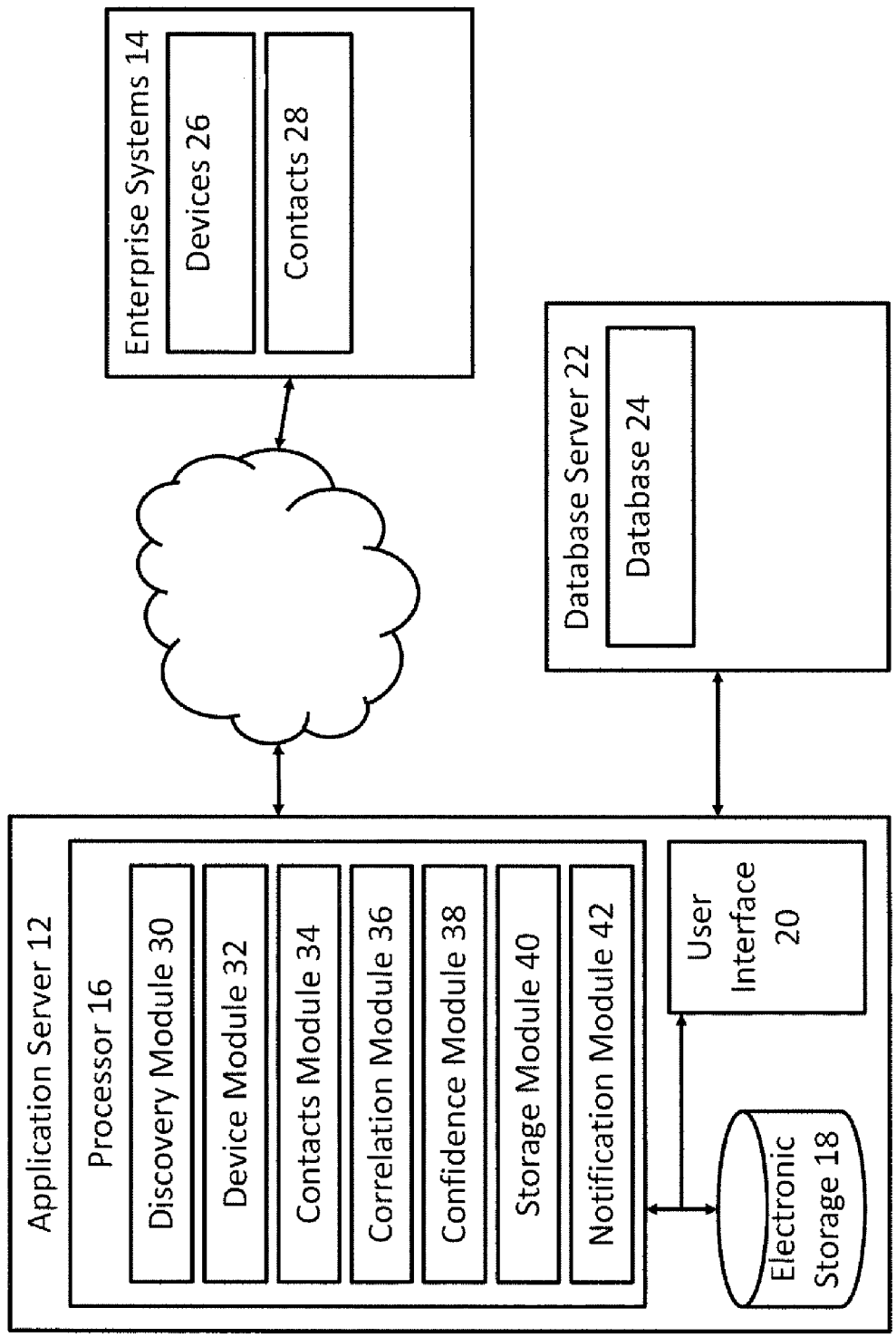
FIG. 1 illustrates a digital certificate management system configured to consolidate information related to digital certificates across enterprise systems.

FIG. 1 illustrates a digital certificate management system 10 configured to consolidate information related to digital certificates across enterprise systems 14. The digital certificates may be used to electronically authenticate actions by devices in enterprise systems 14. In some implementations, system 10 may be configured to automate recurring harvesting of digital certificate information from current and/or future enterprise systems associated with one or more companies. System 10 may be configured to standardize the digital certificate information in a centralized database. System 10 may be configured to identify owners associated with individual digital certificates and pro-actively notify the owners of information associated with digital certificate due dates, for example. In some implementations, system 10 may be configured to automate escalation of the notifications to the owners and/or other entities as expiration dates approach. Compared to other digital certificate management solutions, system 10 provides more complete information about the digital certificates. System 10 is configured to manage digital certificates spanning industry domains and providers. System 10 may leverage industry standard scanners already in place on most networks.

In some implementations, system 10 may comprise an application server 12, enterprise systems 14, and/or other components. Application server 12 may comprise a processor 16, electronic storage 18, a user interface 20, and/or other components. Enterprise systems 14 may comprise devices 26, contacts 28, and/or other components. System 10 may comprise a database server 22, hosting a relational or non-relational database 24. Application server 12 may communicate directly with database server 22 and/or application server 12 may communicate with database server 22 via a network. In some implementations, application server 12 may include database server 22.

Enterprise systems 14 may include one or more software and/or hardware systems configured to support business processes, information flow in a business, business operations, planning systems, customer support systems, configuration management systems, information technology management systems, information technology security and audit systems, human resources systems, and/or other aspects of a business. Enterprise systems 14 may include, for example, certificate authorities (e.g., Entrust, Verisign, etc.), vulnerability assessment tools (e.g., Retina, nCircle, Qualys, Nessus, McAfee Rogue System Detection, etc.), end-point management tools (e.g., IBM Tivoli Endpoint Manager, LANDesk, Microsoft System Center Configuration Manager, Altiris, Blackberry Enterprise Server, ActiveSync, McAfee System Compliance Profiler, etc.), and/or other systems. Enterprise systems 14 may include, for example, configuration management databases (e.g. Atrium, Service Manager, Service Desk Manager, CMI, proprietary in house CMDBs, employee directories (e.g., SAP, customer management systems, incident management systems, proprietary in house contact management systems)), and/or other systems. Devices 26 may include servers, workstations, laptops, tablets, smart phones, point-of-sale systems, electronic storage, network hardware, communication hardware, and/or other devices related to information technology infrastructure, business operations, and/or other aspects of a business. For example, enterprise systems 14 for a corporation may include software and/or hardware to support document management systems, physically secure building facilities, provide access to email, and/or perform other business functions. Enterprise systems 14 for a theme park may include the software and/or hardware necessary to run a ride, run a restaurant, support corporate offices, and/or perform other business functions. Enterprise systems 14 for a media network company may include software and/or hardware to support broadcast communication, content generation, and/or other business functions.

As shown in FIG. 1, processor 16 may be configured to execute one or more computer program modules. The computer program modules may comprise one or more discovery modules 30, one or more device modules 32, one or more contact modules 34, one or more correlation modules 36, one or more confidence modules 38, one or more storage modules 40, one or more notification modules 42, and/or other modules.

Discovery module(s) 30 may be configured to discover digital certificates used by enterprise systems 14. The discovered digital certificates may include digital certificates used to electronically authenticate actions by devices 26 in enterprise systems 14. In some implementations, the certificates may be issued by one or more different issuers (e.g., certificate authorities). In some implementations, the certificates may include self-signed certificates. In some implementations, multiple certificates may be used by one device 26. In some implementations, multiple devices 26 may use one digital certificate. Discovery module(s) 30 may be configured to obtain sets of certificate parameters corresponding to the discovered digital certificates. The certificate parameters may include one or more of expiration dates, serial numbers, subject information, signature information, the issuer, a valid date range, purpose information, a certificate name, a public key, thumbprint, key algorithm, key strength, and/or other parameters. Discovery module 30 may be configured to discover digital certificates via customized and/or off the shelf network scanning tools, customized programming code, agent based solutions, and/or other methods. Example lists 200, and 202 of possible digital certificate parameters and possible discovery tools are shown in FIG. 2.

Returning to FIG. 1, in some implementations, discovery module(s) 30 may be configured to receive, discover, and/or generate a report indicating issued digital certificates related to enterprise systems 14. The discovered digital certificates may include, for example, a first digital certificate having a first set of one or more certificate parameters. The first set of certificate parameters may have a first expiration date. The discovered digital certificates may include, for example, one or more of SSL WEB or SSL CLIENT certificates, certificates designed for peer-to-peer communication, DEVICE certificates, EFS certificates, EFS RECOVERY AGENT certificates, USER certificates, CODE SIGNING certificates, and/or other certificates.

Device module(s) 32 may be configured to identify devices 26 in enterprise systems 14 regardless of whether or not they have used digital certificates to access enterprise systems 14. Device module(s) 32 may be configured to obtain sets of device parameters corresponding to the identified devices. The device parameters may include, for example, a device name, configuration items, device owners, device users, physical locations of the devices, logical (network) locations of the devices, media access control (MAC) address numbers, last known internet protocol (IP) addresses, device specifications, companies and/or business units associated with the devices, parameters related to device operation (e.g., unique codes and/or programming used by the device), and/or other parameters. The identified devices may include, for example, a first device having a first set of one or more device parameters. Example lists 204, and 206 of possible device parameters and possible device discovery tools are shown in FIG. 2.

Returning to FIG. 1, contact module(s) 34 may be configured to identify contacts 28 in enterprise systems 14. Contact module(s) 34 may be configured to obtain sets of contact parameters corresponding to the identified contacts. The contact parameters may include, for example, a name, status, location, team, department, cost center, telephone, electronic mail, direct reports, peers, bosses, and/or other parameters. The identified contacts may include, for example, a first contact having a first set of one or more contact parameters. Example lists 208, and 210 of possible contact parameters and possible contact discovery tools are shown in FIG. 2.

Returning to FIG. 1, correlation module(s) 36 may be configured to determine whether individual sets of certificate parameters are related to individual sets of device parameters and/or individual sets of contact parameters. Correlation module(s) 36 may be configured to determine whether individual sets of certificate parameters are related to individual sets of device and/or contact parameters by analyzing the certificate parameters in the set of certificate parameters relative to the device and/or contact parameters in the set of device and/or contact parameters, and/or vice versa. The analysis may include comparisons of the certificate parameters and/or information related to the certificate parameters, with the device and/or contact parameters and/or information related to the device parameters (and/or vice versa). For example, the name of an individual certificate may be compared with the name of an individual device 26 and/or the user ID of an individual contact 28. Responsive to matches between one or more of the certificate parameters from the set of certificate parameters and one or more device and/or contact parameters from the set of device and/or contact parameters, correlation module 36 may be configured to determine that an individual set of certificate parameters is related to an individual set of device and/or contact parameters. It should be noted that a "match" as used herein may include an exact match (e.g., of a name), and/or an approximate match indicating a relationship between certificate parameters and device parameters. The exact nature of a "match" may be determined by a user of system 10 via programming system 10, entering and/or selecting information via user interface 20, and/or by other methods.

Correlation module(s) 36 may be configured to automatically correlate individual digital certificates with individual devices and/or contacts responsive to determining that the individual sets of certificate parameters and the individual sets of device and/or contact parameters are related. Correlating may include associating and/or linking the individual digital certificates with the individual devices and/or contacts. For example, the first digital certificate may be correlated with the first device and/or contact responsive to determining that the first set of certificate parameters and the first set of device and/or contact parameters are related.

Confidence module(s) 38 may be configured to determine confidence levels that quantify probabilities that the individual sets of certificate parameters of the individual certificates are related to the individual sets of device and/or contact parameters of the individual devices and/or contacts. Confidence module(s) 38 may be configured to determine the confidence levels based on the analysis performed by correlation module(s) 36, and/or other information. The confidence levels may include, for example, a first confidence level. Confidence module(s) 38 may be configured, for example, such that the first confidence level quantifies a first probability that the first set of certificate parameters and the first set of device and/or contact parameters are related. In some implementations, correlation module(s) 36 may correlate the individual digital certificates with the individual devices and/or contacts based on the confidence levels. For example, the first digital certificate may be correlated with the first device and/or contact based on the first confidence level.

In some implementations, confidence module(s) 38 may be configured such that the overall confidence levels comprise weighted confidence scores. A weighted confidence score may comprise a collection of individually weighted confidence levels for individual usage parameters being correlated with individual device and/or contact parameters. The individual confidence levels for individual usage parameters being correlated with individual device and/or contact parameters may be weighted based on individual relationships between specific usage parameters and specific device and/or contact parameters having more importance than others. Confidence module(s) 38 may be configured to determine the importance of the individual relationships and/or the weighted confidence scores based on input from user interface 20, pre-defined algorithms, and/or other information. The pre-defined algorithms may be determined at manufacture, programmed by users of system 10, entered and/or updated via user interface 20, and/or determined by other methods.

Storage module(s) 40 may be configured to store information related to one or more of the discovered digital certificates, the certificate parameters, the identified devices, the device parameters, the correlation of the discovered digital certificates with the identified devices, the confidence levels, the weighted confidence scores, and/or other information electronically. Storage module(s) 40 may be configured to store the information in electronic storage 18, in database 24 of database server 22, and/or in other locations. Storage module(s) 40 may be configured to store the information in a standardized format that incorporates the all of the relevant information, independent of the individual characteristics of the digital certificates, enterprise systems 14, devices 26, and/or other factors. Storage module 38 may be configured to store the information such that it can be retrieved at a later time responsive to a user request via user interface 20.

Storage module(s) 40 may be configured to store the information such that the information may be accessed by application server 12, database server 22, enterprise systems 14, devices 26, and/or other components of system 10. Storage module(s) 38 may be configured to store the information for later transfer to an enterprise system 14, a computer system associated with a user, and/or other systems. Transfer to an enterprise system 14, a computer system associated with a user, and/or other systems may comprise remotely transmitting the information over a wireless network, downloading information directly from application server 12 and/or database server 22, saving a copy to a memory device for manual transmission, and/or other modes of transfer.

Notification module(s) 42 may be configured to generate expiration date notifications before the expiration dates. Notification module 42 may be configured to obtain expiration dates from the certificate parameters determined by discovery module(s) 30. Notification module(s) 42 may be configured such that the notifications are directed to a designated owner of a digital certificate and/or or device 26. Notification module(s) 42 may be configured to obtain digital certificate and/or device 26 ownership information from the information generated by discovery module 30, device module 32, contact module 34, and/or other sources. In some implementations, owners may be individuals (e.g., an employee of a company), groups of individuals (e.g., information technology staff at a given company), a company associated with enterprise systems 14, an individual department of the company associated with enterprise systems 14, and/or other owners.

In some implementations, notification module(s) 42 may be configured such that the owners receive the expiration date notifications directly via, for example, email, text message, and/or other direct notification methods. In some implementations, notification module(s) 42 may be configured such that the owners receive the expiration date notifications indirectly via user interface 20, enterprise systems (for example, incident management software) 14, devices 26, contacts 28, and/or other components of system 10. For example, an owner may access system 10 via user interface 20. Notification module 40 may be configured such that a display screen of user interface 20 displays the expiration date notifications. Notification module(s) 42 may be configured to control enterprise systems 14 and/or devices 26 to display the expiration date notification with enterprise systems 14, and/or on devices 26.

In some implementations, notification module(s) 42 may be configured such that the expiration date notifications include urgency levels. Notification module 42 may be configured such that the urgency levels escalate as the expiration dates approach. The urgency levels may include, for example, a first lower urgency level on a first date farther from the first expiration date and a second higher urgency level on a second date closer to the first expiration date.

Application server 12 may be configured to communicate with enterprise systems 14, and/or other client computing platforms according to a client/server relationship. In some implementations, communication may be wireless. In some implementations, application server 12, enterprise systems 14, database server 22, and/or external resources may be operatively linked via one or more electronic communication links. For example, such electronic communication links may be established, at least in part, via a network such as the Internet and/or other networks. In some implementations, application server 12 may communicate directly with enterprise systems 14, database server 22, and/or other devices. It will be appreciated that this is not intended to be limiting, and that the scope of this disclosure includes implementations in which application server 12, enterprise systems 14, and/or external resources may be operatively linked via some other communication media. Although application server 16 is shown in FIG. 1 as a single entity, this is for illustrative purposes only. In some implementations, application server 16 includes a plurality of servers. Application server 16 may represent processing functionality of a plurality of servers operating in coordination (e.g., in a cloud configuration).

The end user may interact with system 10, application server 12, database server 22, and/or other devices, through user interface 20. User interface 20 may configured to provide an interface between system 10 and one or more users through which the user provides information to and receives information from system 10. This enables data, results, and/or instructions and any other communicable items, collectively referred to as "information," to be communicated between the user and one or more of application server 12, processor 16, enterprise systems 14, devices 26, contacts 28, database server 22, electronic storage 18, and/or other components of system 10. Examples of interface devices suitable for inclusion in user interface 20 include a keypad, buttons, switches, a keyboard, knobs, levers, a display screen, a touch screen, speakers, a microphone, a printer, and/or other interface devices. It is to be understood that other communication techniques, either hard-wired or wireless, are also contemplated by the present disclosure as user interface 20. Other exemplary input devices and techniques adapted for use with client device 14 as user interface 20 include, but are not limited to, an RS-232 port, RF link, an IR link, modem (telephone, cable or other). In short, any technique for communicating information with client device 14 is contemplated by the present disclosure as user interface 20. User interface 20 may include a client computing platform.

In some implementations, electronic storage 18 may be configured to store software algorithms, information determined by processor 16, information received via user interface 20, and/or other information that enables system 10 to function properly. The information stored in electronic storage 18 may be accessible by processor 16, database server 22, enterprise systems 14, devices 26, contacts 28, and/or other components of system 10. The electronic storage media of electronic storage 18 may comprise one or both of system storage that is provided integrally (i.e., substantially non-removable) with one or more components of application server 12 and/or removable storage that is connectable to one or more components of application server 12 via, for example, a port (e.g., a USB port, a firewire port, etc.) or a drive (e.g., a disk drive, etc.). In some implementations, electronic storage 18 may be configured as cloud storage accessed through, for example, the network.

Processor 16 may be configured to provide information processing capabilities in application server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 includes a plurality of processing units. These processing units may be physically located within the same device, or processor 16 may represent processing functionality of a plurality of devices operating in coordination.

Processor 16 may be configured to execute modules 30, 32, 34, 36, 38, 40 and/or 42 by software; hardware; firmware; some combination of software, hardware, and/or firmware; and/or other mechanisms for configuring processing capabilities on processor 16.

It should be appreciated that although modules 30, 32, 34, 36, 38, 40, and 42 are illustrated in FIG. 1 as being co-located within a single processing unit, in implementations in which processor 16 includes multiple processing units, one or more of modules 30, 32, 34, 36, 38, 40, and/or 42 may be located remotely from the other modules. The description of the functionality provided by the different modules 30, 32, 34, 36, 38, 40, and/or 42 described below is for illustrative purposes, and is not intended to be limiting, as any of modules 30, 32, 34, 36, 38, 40 and/or 42 may provide more or less functionality than is described. For example, one or more of modules 30, 32, 34, 36, 38, 40 and/or 42 may be eliminated, and some or all of its functionality may be provided by other ones of modules 30, 32, 34, 36, 38, 40 and/or 42. As another example, processor 16 may be configured to execute one or more additional modules that may perform some or all of the functionality attributed below to one of modules 30, 32, 34, 36, 38, 40 and/or 42.

Figure 3:
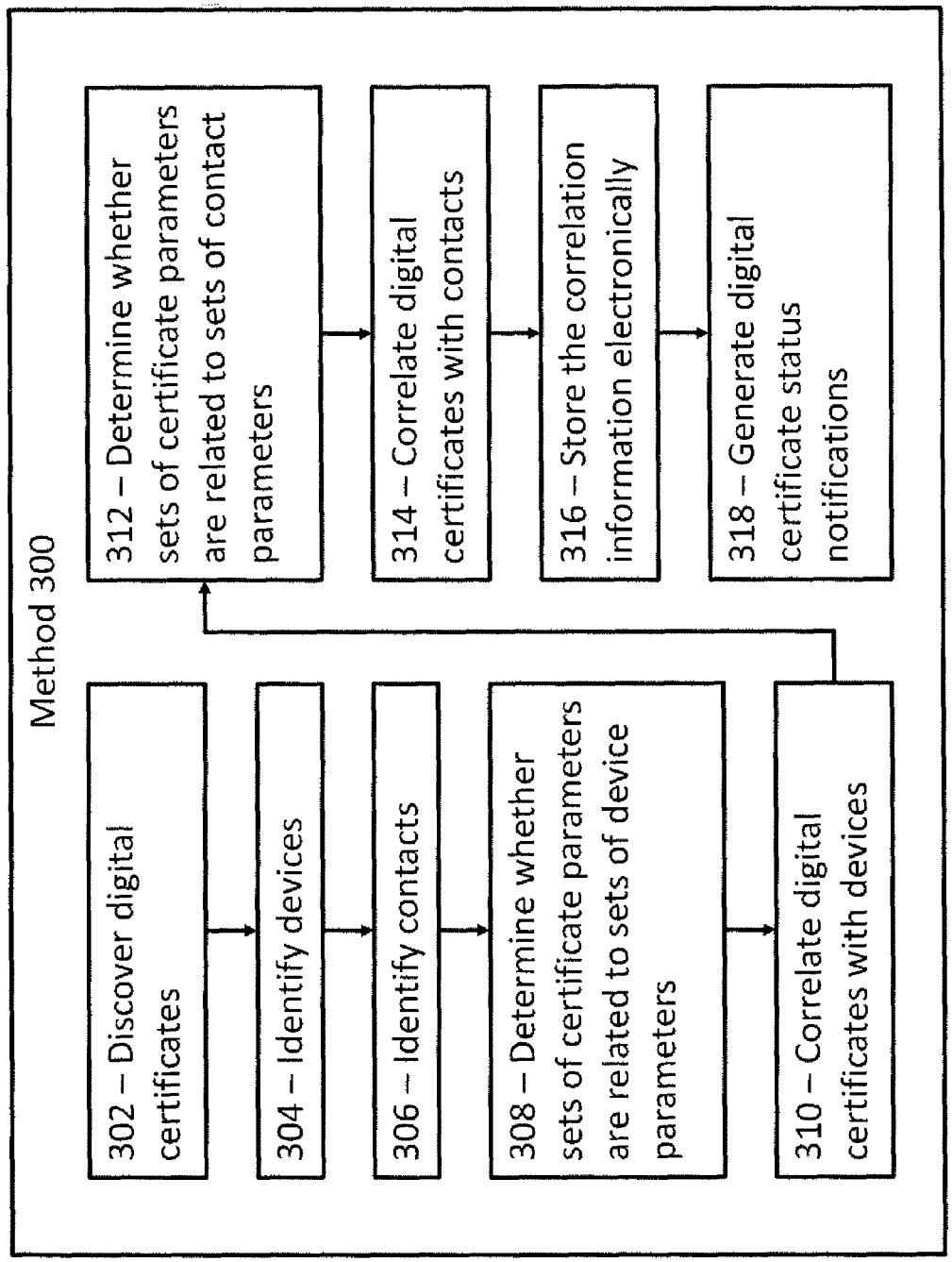
FIG. 3 illustrates a method for consolidating information related to digital certificates from across enterprise systems.

FIG. 3 illustrates a method 300 for consolidating information related to digital certificates from across enterprise systems in accordance with one or more implementations. The operations of method 300 presented below are intended to be illustrative. In some implementations, method 300 may be accomplished with one or more additional operations not described, and/or without one or more of the operations discussed. Additionally, the order in which the operations of method 300 are respectively illustrated in FIG. 3, and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, digital certificates used by the enterprise systems may be discovered. The digital certificates may be used to electronically authenticate actions by devices in the enterprise systems. Sets of certificate parameters corresponding to the discovered digital certificates may be obtained. The discovered digital certificates may include a first digital certificate having a first set of one or more certificate parameters. In some implementations, the sets of certificate parameters for the discovered digital certificates may include expiration dates such that the first set of certificate parameters has a first expiration date. Operation 302 may be performed by a discovery module that is the same as or similar to discovery module 30 (shown in FIG. 1 and described herein), in accordance with one or more implementations.

At an operation 304, devices in the enterprise systems may be identified. Devices in the enterprise system may be identified regardless of whether or not they use digital certificates. Sets of device parameters corresponding to the identified devices may also be obtained. The identified devices may include a first device having a first set of one or more device parameters. Operation 304 may be performed by a device module that is the same as or similar to device module 32 (shown in FIG. 1 and described herein), in accordance with one or more implementations.

At an operation 306, contacts in the enterprise systems may be identified. Sets of contact parameters corresponding to the identified contacts may also be obtained. The identified contacts may include a first contact having a first set of one or more contact parameters. Operation 306 may be performed by a contact module that is the same as or similar to contact module 34 (shown in FIG. 1 and described herein), in accordance with one or more implementations.

At an operation 308, determinations of whether individual sets of certificate parameters are related to individual sets of device parameters may be made. In some implementations, confidence levels that quantify probabilities that the individual sets of certificate parameters of the individual certificates are related to the individual sets of device parameters of the individual devices may be determined. The confidence levels may include a first confidence level. The first confidence level may quantify a first probability that the first set of certificate parameters and the first set of device parameters are related. Operation 308 may be performed by a correlation module that is the same as or similar to correlation module 36 (shown in FIG. 1 and described herein) and/or a confidence module that is the same as or similar to confidence module 38 (shown in FIG. 1 and described herein), in accordance with one or more implementations.

At an operation 310, the digital certificates may be correlated with the devices. Individual digital certificates may be correlated with individual devices responsive to determining that the individual sets of certificate parameters and the individual sets of device parameters are related. The first digital certificate may be correlated with the first device responsive to determining that the first set of certificate parameters and the first set of device parameters are related. Correlating the individual digital certificates with the individual devices may be based on the confidence levels. For example, the first digital certificate may be correlated with the first device based on the first confidence level. Operation 310 may be performed by a correlation module that is the same as or similar to correlation module 36 (shown in FIG. 1 and described herein), in accordance with one or more implementations.

At an operation 312, determinations of whether individual sets of certificate parameters are related to individual sets of contact parameters may be made. In some implementations, confidence levels that quantify probabilities that the individual sets of certificate parameters of the individual certificates are related to the individual sets of contact parameters of the individual contact may be determined. The confidence levels may include a first confidence level. The first confidence level may quantify a first probability that the first set of certificate parameters and the first set of contact parameters are related. Operation 312 may be performed by a correlation module that is the same as or similar to correlation module 36 (shown in FIG. 1 and described herein) and/or a confidence module that is the same as or similar to confidence module 38 (shown in FIG. 1 and described herein), in accordance with one or more implementations.

At an operation 314, the digital certificates may be correlated with the contacts. Individual digital certificates may be correlated with individual contacts responsive to determining that the individual sets of certificate parameters and the individual sets of contact parameters are related. The first digital certificate may be correlated with the first contact responsive to determining that the first set of certificate parameters and the first set of contact parameters are related. Correlating the individual digital certificates with the individual contacts may be based on the confidence levels. For example, the first digital certificate may be correlated with the first contact based on the first confidence level. Operation 312 may be performed by a correlation module that is the same as or similar to correlation module 36 (shown in FIG. 1 and described herein), in accordance with one or more implementations.

At an operation 316, the correlation information may be stored electronically. The correlation information may be related to one or more of the discovered digital certificates, the certificate parameters, the identified devices, the device parameters, the correlation of the discovered digital certificates with the identified devices, the identified contacts, the contact parameters, or the correlation of the discovered digital certificates with the identified contacts. In some implementations, the correlation information may be stored in an electronic database. Operation 316 may be performed by a storage module that is the same as or similar to storage module 40 (shown in FIG. 1 and described herein), in accordance with one or more implementations.

At an operation 318, digital certificate expiration date and/or other status notifications may be generated. The expiration date notifications may be generated before the expiration dates. The expiration date notifications may include urgency levels. The urgency levels may escalate as the expiration dates approach. The urgency levels may include a first lower urgency level on a first date farther from the first expiration date and a second higher urgency level on a second date closer to the first expiration date. Operation 318 may be performed by a notification module that is the same as or similar to notification module 42 (shown in FIG. 1 and described herein), in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A digital certificate management system configured to consolidate information related to digital certificates across enterprise systems, the digital certificates used to electronically authenticate actions by devices in the enterprise systems, the digital certificate management system comprising:
    one or more processors configured to execute computer program modules, the computer program modules comprising:
    a discovery module configured to discover digital certificates used by the enterprise systems and to obtain sets of certificate parameters corresponding to the discovered digital certificates, the discovered digital certificates including a first digital certificate having a first set of one or more certificate parameters;
    a device module configured to identify the devices in the enterprise systems and to obtain sets of device parameters corresponding to the identified devices, the identified devices including a first device having a first set of one or more device parameters;
    a correlation module configured to determine whether individual sets of certificate parameters are related to individual sets of device parameters and to automatically correlate individual digital certificates with individual devices responsive to determining that the individual sets of certificate parameters and the individual sets of device parameters are related such that the first digital certificate is correlated with the first device responsive to determining that the first set of certificate parameters and the first set of device parameters are related; and
    a confidence module configured to determine confidence levels that quantify probabilities that the individual sets of certificate parameters of the individual certificates are related to the individual sets of device parameters of the individual devices, the confidence levels including a first confidence level, the confidence module configured such that the first confidence level quantifies a first probability that the first set of certificate parameters and the first set of device parameters are related.

2. The system of claim 1, wherein the correlation module correlates the individual digital certificates with the individual devices based on the confidence levels such that the first digital certificate is correlated with the first device based on the first confidence level.

3. The system of claim 1, wherein the discovery module is configured such that the sets of certificate parameters for the discovered digital certificates include expiration dates such that the first set of certificate parameters has a first expiration date.

4. The system of claim 3, further comprising a notification module configured to generate expiration date notifications before the expiration dates.

5. The system of claim 4, wherein the notification module is configured such that the expiration date notifications include urgency levels.

6. The system of claim 5, wherein the notification module is configured such that the urgency levels escalate as the expiration dates approach, the urgency levels including a first lower urgency level on a first date farther from the first expiration date and a second higher urgency level on a second date closer to the first expiration date.

7. The system of claim 1, wherein the discovered digital certificates include one or more of SSL certificates, DEVICE certificates, EFS certificates, EFS RECOVERY AGENT certificates, USER certificates, or CODE SIGNING certificates.

8. The system of claim 1, wherein the certificate parameters include one or more of an expiration date, a serial number, subject information, signature information, an issuer, a valid date range, purpose information, or a public key.

9. The system of claim 1, wherein the enterprise systems include one or more of certificate authorities, vulnerability assessment systems, end-point management systems, incident management systems, configuration management systems, or employee directory systems.

10. A method for consolidating information related to digital certificates from across enterprise systems, the digital certificates used to electronically authenticate actions by devices in the enterprise systems, the method comprising:

discovering digital certificates used by the enterprise systems and obtaining sets of certificate parameters corresponding to the discovered digital certificates, the discovered digital certificates including a first digital certificate having a first set of one or more certificate parameters;

identifying the devices in the enterprise systems and obtaining sets of device parameters corresponding to the identified devices, the identified devices including a first device having a first set of one or more device parameters;

determining whether individual sets of certificate parameters are related to individual sets of device parameters and automatically correlating individual digital certificates with individual devices responsive to determining that the individual sets of certificate parameters and the individual sets of device parameters are related such that the first digital certificate is correlated with the first device responsive to determining that the first set of certificate parameters and the first set of device parameters are related; and determining confidence levels that quantify probabilities that the individual sets of certificate parameters of the individual certificates are related to the individual sets of device parameters of the individual devices, the confidence levels including a first confidence level, the first confidence level quantifying a first probability that the first set of certificate parameters and the first set of device parameters are related.

11. The method of claim 10, further comprising correlating the individual digital certificates with the individual devices and/or individual contacts based on the confidence levels such that the first digital certificate is correlated with the first device and/or a first contact based on the first confidence level.

12. The method of claim 10, wherein the sets of certificate parameters for the discovered digital certificates include expiration dates such that the first set of certificate parameters has a first expiration date.

13. The method of claim 12, further comprising generating expiration date notifications before the expiration dates.

14. The method of claim 13, wherein the expiration date notifications include urgency levels.

15. The method of claim 14, wherein the urgency levels escalate as the expiration dates approach, the urgency levels including a first lower urgency level on a first date farther from the first expiration date and a second higher urgency level on a second date closer to the first expiration date.

16. The method of claim 13, further comprising determining owners to receive the expiration date notifications based on one or more of the sets of certificate parameters, the sets of device parameters, or the correlations of individual digital certificates with individual devices; and effectuating transmission of the expiration date notifications to the determined owners.

17. The method of claim 10, wherein the discovered digital certificates include one or more of SSL certificates, DEVICE certificates, EFS certificates, EFS RECOVERY AGENT certificates, USER certificates, or CODE SIGNING certificates.

18. The method of claim 10, wherein the certificate parameters include one or more of an expiration date, a serial number, subject information, signature information, an issuer, a valid date range, purpose information, or a public key.

19. The method of claim 10, wherein the enterprise systems include one or more of certificate authorities, vulnerability assessment systems, end-point management systems, configuration management systems, or employee directory systems.

* * * * *